Oct. 14, 1952     L. A. MAYBARDUK     2,613,629
FULL-VIEW CONCENTRIC INDICATOR

Filed Aug. 30, 1950     2 SHEETS—SHEET 1

INVENTOR.
LEON A. MAYBARDUK
BY
H. A. Mackey
ATTORNEY

Oct. 14, 1952 L. A. MAYBARDUK 2,613,629
FULL-VIEW CONCENTRIC INDICATOR
Filed Aug. 30, 1950 2 SHEETS—SHEET 2
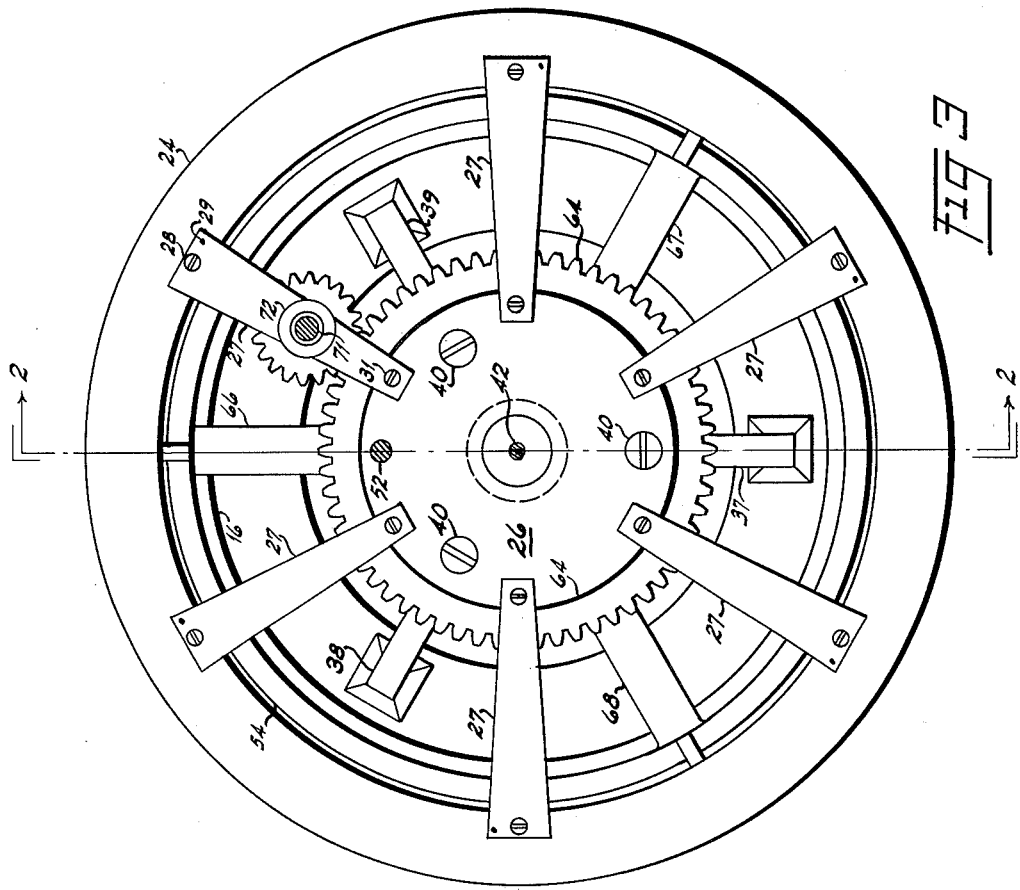
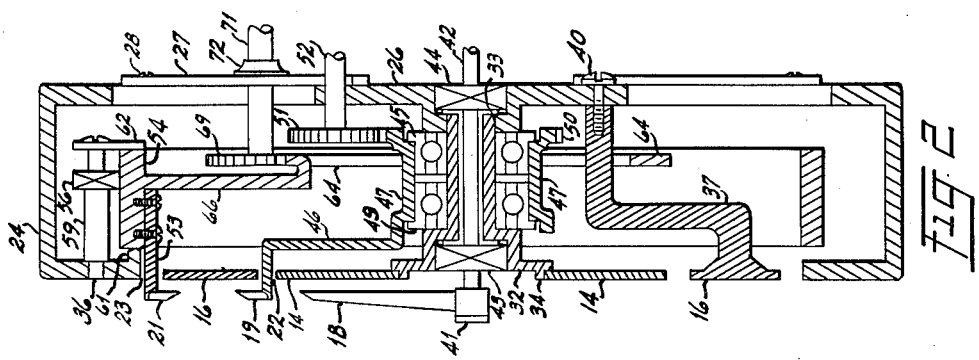
INVENTOR.
LEON A. MAYBARDUK
BY
*H. A. Mackey*
ATTORNEY Patented Oct. 14, 1952

2,613,629

UNITED STATES PATENT OFFICE 2,613,629

FULL-VIEW CONCENTRIC INDICATOR

Leon A. Maybarduk, Sunnyside, N. Y., assignor to General Precision Laboratory Incorporated, a corporation of New York Application August 30, 1950, Serial No. 182,350

4 Claims. (Cl. 116—129)

This invention relates to indicators and more specifically to indicators of the circular dial type having a plurality of separately movable hands or pointers cooperating with a plurality of stationary scales.

One purpose of the invention is to provide an instrument having pointer and reference means characterized by improved visibility of the indicia.

Another purpose of the invention is to provide improved dial arrangements which are easy and convenient to read and observe and in which the indicators are pointers that are mutually independent.

A further purpose of the invention is to provide an instrument having a plurality of stationary circular dials having complete full circle visibility, and having pointers with full circle mobility for indication of indicia. Complete visibility of each dial is secured by a specific arrangement of the pointers whereby no dial is crossed at any point by any pointer excepting that one designed to cooperate with the indicia of that particular scale.

In the drawings:

Figure 2 is a sectional side view of the dial taken on the line 2—2 of Fig. 3.

Figure 3 is a rear view of the dial of Fig. 1.

Figure 1:
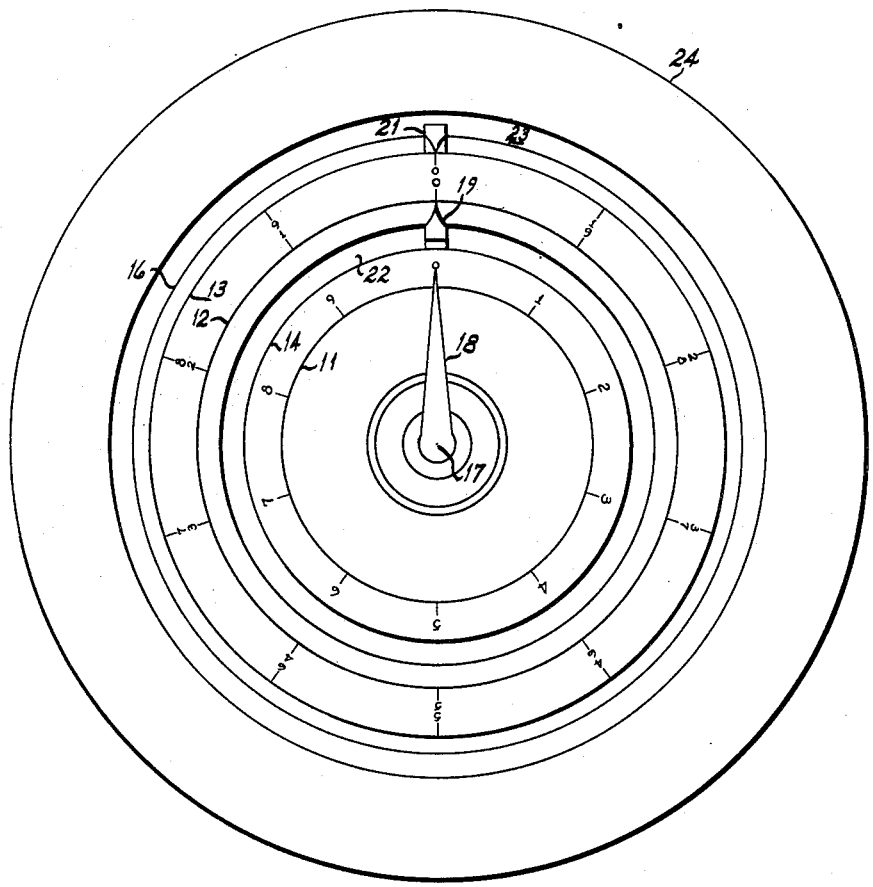
Figure 1 is a view of the face of a dial embodying the invention.

Referring now to Fig. 1, three concentric annular scales are indicated at 11, 12 and 13. Each of these scales covers the full 360 degrees of a circle and each is inscribed upon a base consisting of an annular disc or ring, all bases being in the same plane. However, the same objectives will be served if one or more of the scales and the associated bases are offset to occupy nearby parallel planes, presenting the same aspect to the observer as that illustrated in Fig. 1. The innermost scale 11 is inscribed upon a disc or annular ring 14 while the scales 12 and 13 are both inscribed upon a single flat ring 16. It is obvious, however, that the outermost scale 13 may as well be inscribed upon the surrounding structure, with an appropriate change in the pointer indicating thereupon. Both the disc 14 and the flat ring 16 are centered upon a single axis 17 that is perpendicular to their plane. A pointer 18 is arranged for rotation about the axis 17 and is positioned to indicate upon the inner scale 11. A second pointer 19 is arranged for rotation about the same axis 17 and is positioned to indicate upon the intermediate scale 12, while a third pointer 21 is also arranged for rotation about the axis 17 and is positioned to indicate upon the outer scale 13. An annular slot or space 22 is provided between the disc 14 and the flat ring 16 through which the shaft of the pointer 19 is brought forward so that only its tip is visible to the observer, its shaft being completely concealed by the disc 14 yet permitting full circular rotation of the pointer shaft in the slot about its axis 17 without limit. Similarly, the pointer 21 is brought forward through a slot 23 between the flat ring 16 and a surrounding frame structure 24 so that the pointer 21 has unlimited freedom of rotation about its axis 17 while only its tip is visible, its shaft being concealed behind the flat ring 16 and the disc 14. The exact construction by which the dial aspect illustrated in Fig. 1 is achieved is as follows.

Referring to Figs. 2 and 3, in which similar parts are numbered alike and have the same reference numbers as are employed in Fig. 1, a frame 24 is rigidly attached to a hub 26 by means of six spoke members 27. Each spoke member is screwed and pinned to the frame 24 as shown, for example, at 28 and 29, and screwed to the hub 26 as at 31. A hub extension 32 is pressed into the hub at 33. The disc 14 is pressed onto a collar extension 34 of the hub extension 32, so that it lies in the plane of the frame face 36 and perpendicular to the axis of the hub 26. The flat ring 16 is supported by three arms 37, 38 and 39, so that it also is in the plane of the disc 14 and frame face 36.

The arms 37, 38 and 39 are fastened to the hub 26 by the threaded members 40 and extend forwardly and outwardly of the hub 26 in such fashion that a clear space inwardly and forwardly of these arms is provided for operation of the pointer 19 and its actuating mechanism and at the same time a clear space outwardly and rearwardly of the arms is provided for operation of the pointer 21. Thus the supporting arms 37, 38 and 39 while acting as a rigid support for the annular scale bearing ring 16 do not interfere with nor prevent free 360° movement of the outer pointers 19 and 21.

The inner pointer for indication on the scale of the disc 14 is fastened to a pointer hub 41 that in turn is secured to an axial shaft 42. This axial shaft 42 is concentric with the hub 26 and hub extension 32, and is journalled in them by means of anti-friction bearings 43 and 44. The middle pointer 19 is borne on a pointer shaft 46 that extends from it to a cylindrical sleeve 47. This sleeve is borne on two anti-friction bearings 45 and 49 secured on the hub extension 32, so that the sleeve can rotate around the hub extension and the pointer 19 borne thereby can rotate concentrically with the axial shaft. In so rotating, the pointer shaft 46 moves in an annular space or slot 22 left for the purpose between the disc 14 and the inner edge of the flat ring 16.

The shape of the shaft extension 46 is such that it may move freely between the disc 14 and the three arms 37, 38 and 39, and avoid interference with them. The rear edge of the cylindrical sleeve 47 bears a spur gear 50. This gear 50 is meshed with a pinion 51 that is secured on a shaft 52 journalled in a bearing hole in the hub 26. The outer pointer 21 is borne on a pointer shaft 53 that moves in the slot 23 between the flat ring 16 and the frame 24. This pointer shaft 53 is screwed to a cylindrical rim 54 which is borne externally by three anti-friction bearings 56, fastened 120° apart to the frame by studs 59 fastened to the frame 24. The rim is secured against axial motion by a flange 61 on the frame 24 and by a retaining member 62 screwed to the stud 59 which may include anti-friction members such as balls or rollers. A spur gear 64 is connected to the rim 54 by means of three arms 66, 67 and 68, each arm being joined to the inner surface of the rim 54 and to the inner edge of the spur gear 64. The rim 54, the arms 66, 67 and 68, and the spur gear 64 are all carefully positioned so as not to interfere with the three flat ring arms 37, 38 and 39, and so as to avoid interference with the pinion 51. A second pinion 69 is meshed with the spur gear 64 and is fixed to a shaft 71 journalled in one of the spokes 27 at the boss 72.

While the invention has been described in connection with an instrument utilizing three dials, it will be recognized that the same principle may be utilized to provide a device having a greater number of indicator scales, it being only necessary to duplicate the construction of the intermediate indicator mechanism if a greater number of indications are desired.

What is claimed is:

1. An indicator comprising, a casing having front and rear faces, a hub member fastened to the rear face of said casing and extending forwardly towards the front face thereof, an inner dial fastened to the forwardly extending portion of said hub member and lying substantially in the plane of the front of said casing, at least one intermediate dial, supporting means therefor fastened to the rear face of said casing and extending forwardly and outwardly positioning said intermediate dial in substantially the same plane as said inner dial but radially spaced therefrom provided a circumferential slot therebetween, a shaft mounted internally and axially of said hub member, a pointer carried thereby cooperating with said inner dial, a rotatable member rotatably mounted externally on said hub member, a pointer arm carried by said rotatable member and positioned forwardly and radially inwardly of said supporting means, said pointer arm having an offset end portion extending through said circumferential slot and carrying a pointer cooperating with said intermediate dial.

2. An indicator comprising, a casing having front and rear inwardly extending rim portions, a hub member provided with a flange portion and a forwardly extending portion, spider arms fastened to said rear rim portion and said flange portion centrally supporting said hub member in said casing, a first dial bearing suitable indicia affixed to the forwardly extending portion of said hub member and positioned thereby to lie in substantially the same plane as said front rim portion, a second dial provided with suitable indicia, supporting members therefor fastened to the flange portion of said hub member and extending forwardly and outwardly thereof positioning said second dial in substantially the same plane as said first dial but radially spaced therefrom providing a circumferential slot therebetween, a shaft carried by and extending through said hub member, a pointer thereon cooperating with the indicia on said first dial, a tubular member rotatably mounted on said hub member, a pointer arm carried thereby positioned in the space between said first dial and said supporting members and an offset end portion on said pointer arm extending through said circumferential slot and cooperating with the indicia on said second dial.

3. An indicator comprising, a casing having front and rear inwardly extending rim portions, a hub member provided with a flange portion and a forwardly extending portion, spider arms fastened to said rear rim portion and said flange portion centrally supporting said hub member in said casing, an inner dial affixed to the forwardly extending portion of said hub and lying in substantially the same plane as said front rim portion, an intermediate dial, supporting members therefor fastened to the flange portion of said hub member and extending forwardly and outwardly thereof positioning said intermediate dial in substantially the same plane as said inner dial but radially spaced therefrom and from the front rim portion of said casing providing a first circumferential slot between said inner and intermediate dials and a second circumferential slot between said intermediate dial and said front rim portion, a shaft carried by and extending through said hub member, a pointer carried thereby cooperating with said inner dial, a tubular member rotatably mounted on said hub member, a pointer arm carried thereby positioned forwardly and radially inwardly of said supporting members said pointer arm having an offset end portion extending through said first circumferential slot cooperating with a dial face adjacent thereto, a rotatable annular member rotatably mounted internally of said casing but radially spaced from said tubular member, a pointer arm carried thereby spaced radially outwardly of said supporting members, said last mentioned pointer arm having an offset end portion extending through said second circumferential slot and provided with a pointer for cooperation with suitable indicia.

4. An indicator comprising, a casing having front and rear inwardly extending rim portions, a hollow hub having flanges at each end thereof, spider arms fastened to the rear rim of said casing and the rear flange of said hub centrally supporting said hub in said casing, a first dial bearing suitable indicia affixed to the front flange of said hub and supported thereby in substantially the same plane as the front rim portion of said casing, a rotatable shaft extending through said hollow hub having an indicator arm affixed to its outer end cooperating with the indicia of said first dial, a second dial having indicia inscribed thereon, supporting arms therefor having their ends fastened to the rear flange of said hub said arms extending generally forwardly and outwardly supporting said second dial in substantially the same plane as said first dial but circumferentially spaced from both said first dial and the front rim of said casing whereby a first circumferential slot is formed between said first and second dials and a second circumferential slot is formed between said second dial and the front rim of said casing, an annular member mounted on said hub radially inwardly of said supporting arms and rotatable on said hub, an indicator arm extending radially of the front edge of said annular member positioned in the space between said first dial and said supporting arms, said indicator arm being provided with an offset end portion extending through the slot formed between said first and second dials and cooperating with the indicia on one of said dials, a second annular member rotatably supported by said casing and spaced radially outwardly of said supporting arms, an indicator arm carried thereby having an offset end portion extending through the circumferential slot formed between said second dial and said casing and means for independently actuating each of said indicator arms.

LEON A. MAYBARDUK.

REFERENCES CITED

The following references are of record in the file of this patent:

UNITED STATES PATENTS

| Number | Name | Date |
|---|---|---|
| 1,352,719 | Baldwin | Sept. 14, 1920 |
| 1,617,310 | Sperry | Feb. 8, 1927 |
| 1,715,270 | Bassett | May 28, 1929 |
| 1,850,640 | Sperry | Mar. 22, 1932 |
| 2,112,704 | Mackay | Mar. 29, 1938 |
| 2,124,960 | Waring | July 26, 1938 |